US008117450B2

(12) United States Patent
Krawetz

(10) Patent No.: US 8,117,450 B2
(45) Date of Patent: Feb. 14, 2012

(54) SYSTEM AND METHOD FOR SECURE DATA TRANSMISSION

(75) Inventor: Neal A. Krawetz, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 3308 days.

(21) Appl. No.: 09/975,815

(22) Filed: Oct. 11, 2001

(65) Prior Publication Data
US 2003/0072454 A1 Apr. 17, 2003

(51) Int. Cl.
*H04L 9/32* (2006.01)

(52) U.S. Cl. .......... 713/170; 713/187; 713/189; 380/28; 380/42

(58) Field of Classification Search .......... 713/170, 713/161, 180, 187, 189; 380/25, 262, 277, 380/28, 42
See application file for complete search history.

(56) References Cited

U.S. PATENT DOCUMENTS

| 5,416,842 | A | * | 5/1995 | Aziz | 380/30 |
|---|---|---|---|---|---|
| 5,588,060 | A | * | 12/1996 | Aziz | 380/30 |
| 5,689,567 | A | * | 11/1997 | Miyauchi | 713/176 |
| 5,701,343 | A | * | 12/1997 | Takashima et al. | 705/51 |
| 5,757,915 | A | * | 5/1998 | Aucsmith et al. | 713/187 |
| 5,764,772 | A | * | 6/1998 | Kaufman et al. | 380/30 |
| 5,796,830 | A | * | 8/1998 | Johnson et al. | 380/286 |
| 5,937,066 | A | * | 8/1999 | Gennaro et al. | 380/286 |
| 5,987,133 | A | * | 11/1999 | Aisaka | 713/170 |
| 6,058,188 | A | * | 5/2000 | Chandersekaran et al. | 380/286 |
| 6,085,321 | A | * | 7/2000 | Gibbs et al. | 713/170 |
| 6,178,508 | B1 | | 1/2001 | Kaufman | |
| 6,615,348 | B1 | * | 9/2003 | Gibbs | 713/162 |
| 6,728,378 | B2 | * | 4/2004 | Garib | 380/259 |
| 6,751,736 | B1 | * | 6/2004 | Bowman et al. | 713/189 |
| 6,754,825 | B1 | * | 6/2004 | Lennie et al. | 713/181 |
| 6,788,709 | B1 | * | 9/2004 | Hyakutake | 370/486 |
| 6,816,970 | B2 | * | 11/2004 | Morgan et al. | 713/183 |
| 6,829,242 | B2 | * | 12/2004 | Davison et al. | 370/401 |
| 6,836,845 | B1 | * | 12/2004 | Lennie et al. | 713/181 |
| 6,931,128 | B2 | * | 8/2005 | Roberts | 380/44 |
| 6,959,394 | B1 | * | 10/2005 | Brickell et al. | 726/5 |

(Continued)

FOREIGN PATENT DOCUMENTS

CA 2210763 A * 1/1999

(Continued)

OTHER PUBLICATIONS

Alfred Menezes, Paul Van Oorschot, Scott Vanstone; "Handbook of Applied Cryptography"; 1997 CRC Press LLC; pp. 323, 388, 390, 509, and 510.*

(Continued)

*Primary Examiner* — Carl Colin
*Assistant Examiner* — Harunur Rashid

(57) ABSTRACT

A system for secure data transmission comprises a processor, a memory coupled to the processor, and a string generator stored in the memory and executable by the processor. The string generator is adapted to generate a character string. The system also comprises a hashing engine stored in the memory and executable by the processor. The hashing engine is adapted to generate a hash key using the character string and a private key. The system further comprises an encryption engine stored in the memory and executable by the processor. The encryption engine is adapted to encrypt the data using the hash key. The processor is adapted to transmit the encrypted data, an identification key related to the private key, and the character string to a recipient.

34 Claims, 3 Drawing Sheets

U.S. PATENT DOCUMENTS

| | | | |
|---|---|---|---|
| 7,043,637 B2 * | 5/2006 | Bolosky et al. | 713/171 |
| 7,110,539 B1 * | 9/2006 | Bao et al. | 380/28 |
| 2001/0002929 A1 * | 6/2001 | Mache | 380/247 |
| 2001/0042210 A1 * | 11/2001 | Blaker et al. | 713/190 |
| 2002/0094085 A1 * | 7/2002 | Roberts | 380/262 |

FOREIGN PATENT DOCUMENTS

| | | |
|---|---|---|
| DE | 19518546 C1 | 5/1995 |
| DE | 19822795 A1 | 5/1998 |
| DE | 19822705 A1 | 11/1999 |
| EP | 791901 A2 * | 8/1997 |
| JP | 2000-24478 | 9/2000 |
| JP | 2001086110 A * | 3/2001 |
| JP | 2002290391 | 3/2001 |

OTHER PUBLICATIONS

Callas, J. et. al.: OpenPGP Message Format RFC 2440, Nov. 1998, pp. 1 to 65.

Neal Krawetz, Deutsches Patent—Und Markenamt, Office Action dated Apr. 16, 2007, Pat App No. 10244727.6 filed Sep. 25, 2002, Patent No. 10244727, granted Jan. 10, 2008.

Neal Krawetz, Deutsches Patent—Und Markenamt, Translation Office Action dated Apr. 16, 2007, Pat App No. 10244727.6 filed Sep. 25, 2002, Patent No. 10244727, granted Jan. 10, 2008.

* cited by examiner

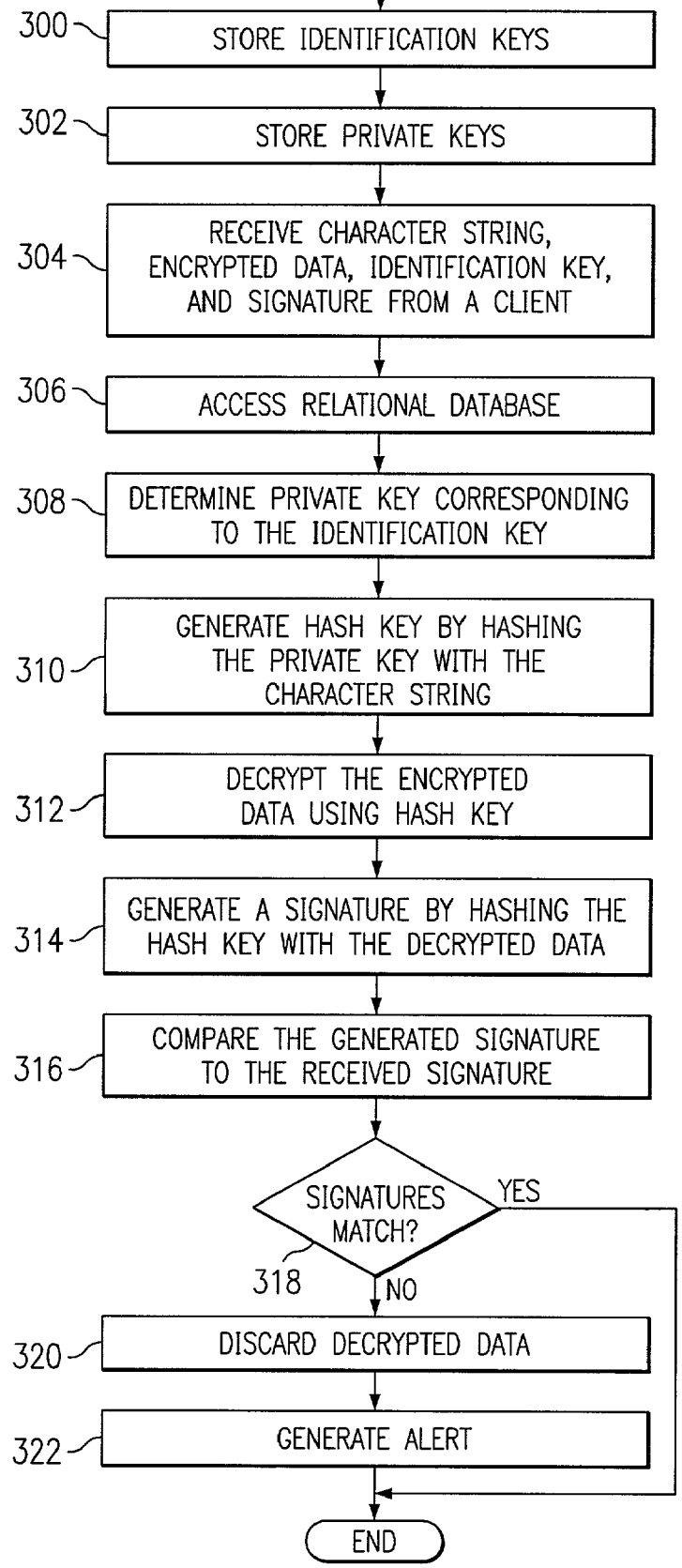

US 8,117,450 B2

SYSTEM AND METHOD FOR SECURE DATA TRANSMISSION

TECHNICAL FIELD OF THE INVENTION

The present invention relates generally to the field of data processing and, more particularly, to a system and method for secure data transmission.

BACKGROUND OF THE INVENTION

The Internet has become a popular avenue for transferring data. However, a considerable amount of data transferred via the Internet may be of a sensitive or confidential nature. Thus, sensitive or confidential data transferred via the Internet is oftentimes encrypted for protection and authenticated using a certificate generally issued by a certificate authority. However, encrypted data transfers and certificates suffer several disadvantages. For example, secure socket layers (SSL) use time-based certificates. Because the set time at each end of the data transfer may be different, for example, between a sender and a server, valid certificates may be incorrectly expired or expired certificates may be inadvertently accepted. Web browsers may be configured to prompt a user of an invalid certificate. However, many users may simply accept the certificate without understanding the purpose of the certificate or the consequences of accepting an invalid certificate. Additionally, automated senders generally require a hard-coded response. Accordingly, if an invalid certificate is accepted, the data transfer may be subject to third party interception. Furthermore, if the certificate is rejected, a determination must generally be made regarding where to obtain a valid certificate.

SUMMARY OF THE INVENTION

In accordance with one embodiment of the present invention, a method for secure data transmission comprises generating a character string at a sender, generating a hash key using the character string and a private key, and encrypting the data using the hash key. The method also comprises transmitting an identification key associated with the sender, the character string, and the encrypted data from the sender to a recipient.

In accordance with another embodiment of the present invention, a system for secure data transmission comprises a processor, a memory coupled to the processor, and a string generator stored in the memory and executable by the processor. The string generator is adapted to generate a character string. The system also comprises a hashing engine stored in the memory and executable by the processor. The hashing engine is adapted to generate a hash key using the character string and a private key. The system further comprises an encryption engine stored in the memory and executable by the processor. The encryption engine is adapted to encrypt the data using the hash key. The processor is adapted to transmit the encrypted data, an identification key related to the private key, and the character string to a recipient.

In accordance with yet another embodiment of the present invention, a method for secure data transmission comprises receiving a character string and an identification key from the sender. The method also comprises receiving encrypted data from the sender. The method further comprises determining a private key associated with the sender using the identification key and decrypting the encrypted data using the private key and the character string.

BRIEF DESCRIPTION OF THE DRAWINGS

For a more complete understanding of the present invention and the advantages thereof, reference is now made to the following descriptions taken in connection with the accompanying drawings in which:

FIG. 3 is a flow chart illustrating a method for secure data transmission in accordance with an embodiment of the present invention.

DETAILED DESCRIPTION OF THE DRAWINGS

Figure 1:
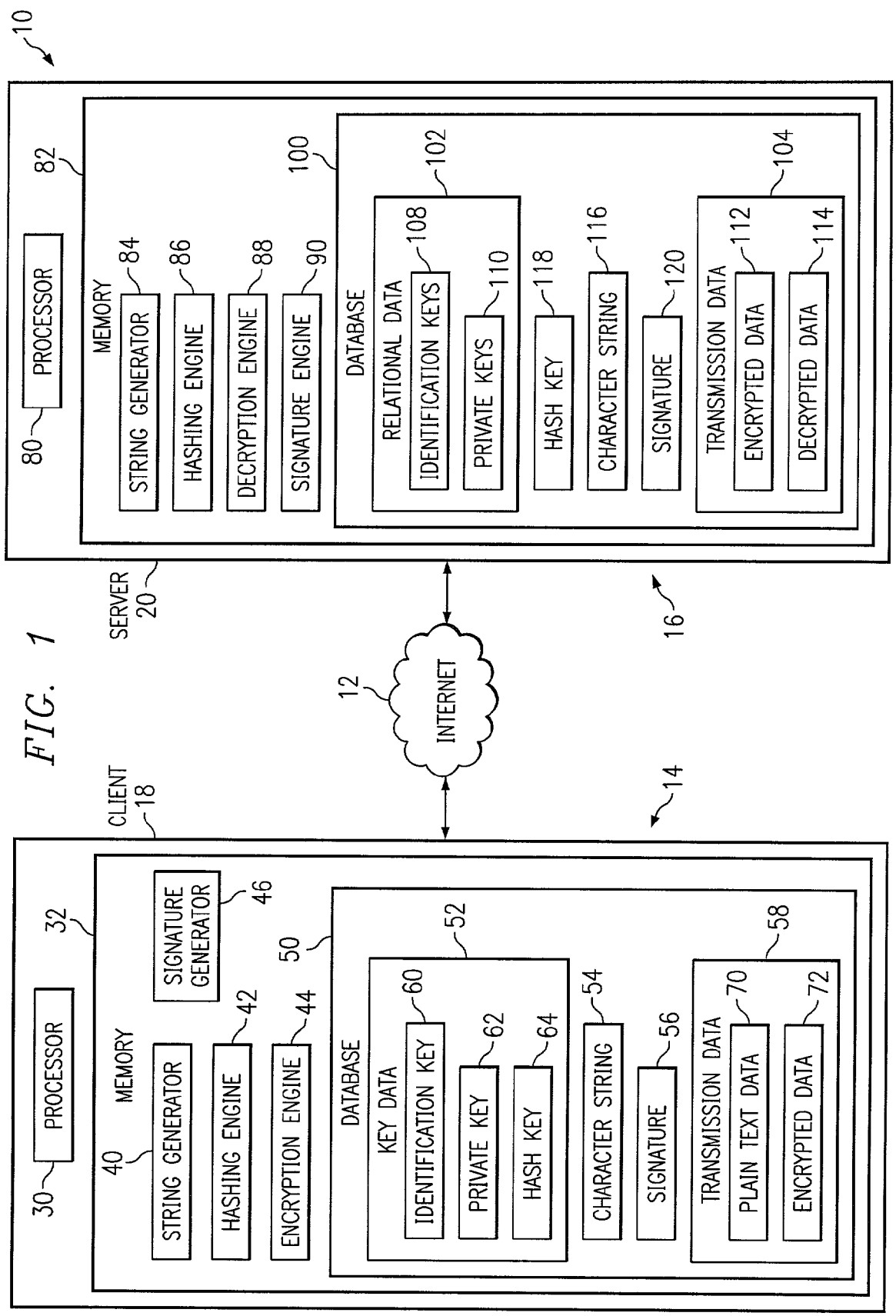
FIG. 1 is a diagram illustrating a system for secure data transmission in accordance with an embodiment of the present invention.
Figure 2:
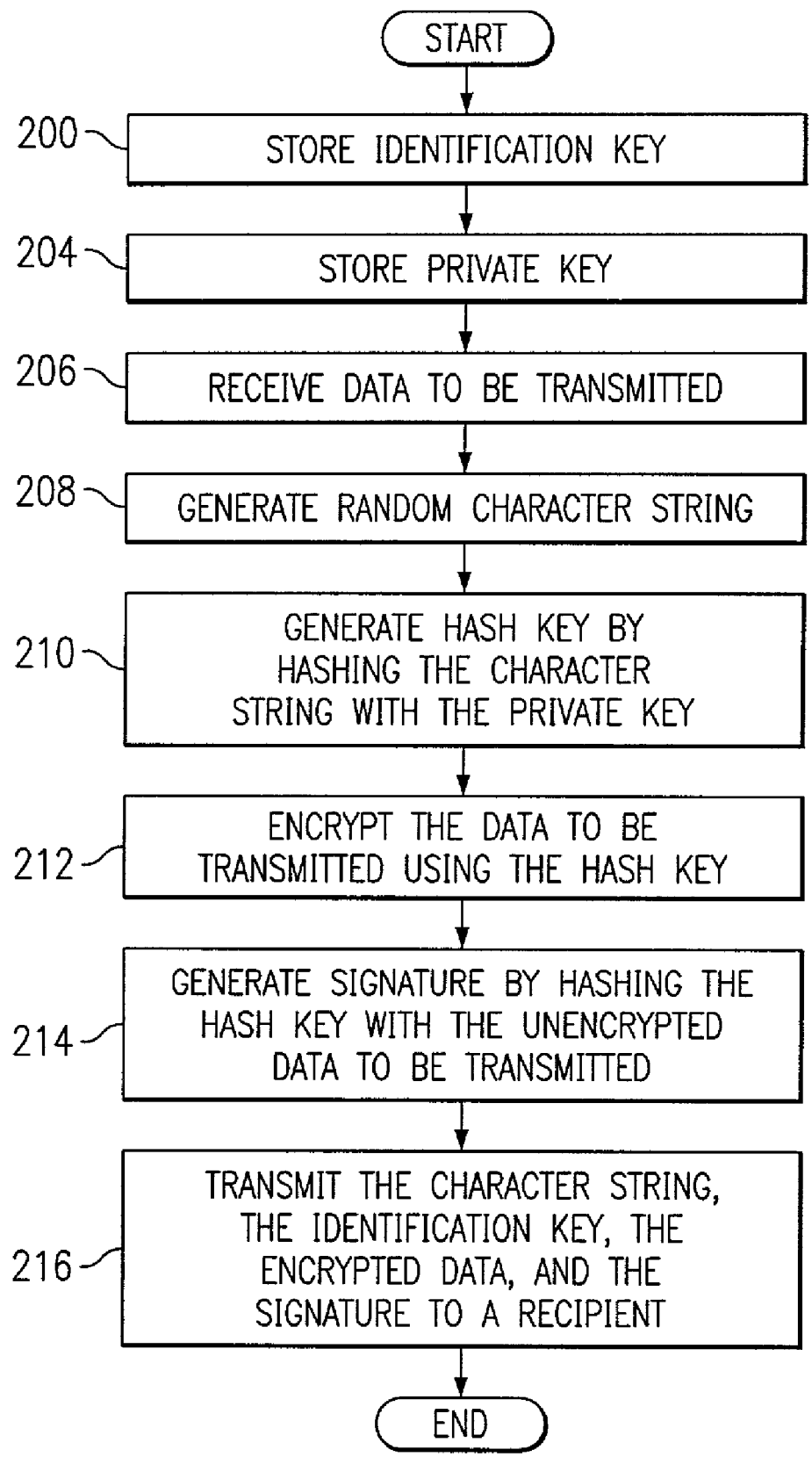
FIG. 2 is a flow chart illustrating a method for secure data transmission in accordance with an embodiment of the present invention.

The preferred embodiments of the present invention and the advantages thereof are best understood by referring to FIGS. 1 through 3 of the drawings, like numerals being used for like and corresponding parts of the various drawings.

FIG. 1 is a diagram illustrating a system 10 for secure data transmission in accordance with an embodiment of the present invention. In the illustrated embodiment, information or data is communicated via the Internet 12 between a sender 14 and a recipient 16. For example, in the illustrated embodiment, the sender 14 and recipient 16 comprise a client 18 communicating with a server 20, respectively, via the Internet 12; however, it should be understood that other communication components and other communication mediums, such as, but not limited to, local area networks or wide area networks, may also be used. Additionally, as will be further described below, the present invention may be used for secure data transmission from the client 18 to the server 20 or from the server 20 to the client 18.

In the illustrated embodiment, the client 18 comprises a processor 30 coupled to a memory 32. The present invention also encompasses computer software that may be stored in the memory 32 and executed by the processor 30. In this embodiment, the client 18 comprises a string generator 40, a hashing engine 42, an encryption engine 44, and a signature generator 46, which are computer software programs. In FIG. 1, the string generator 40, hashing engine 42, encryption engine 44, and signature generator 46 are illustrated as being stored in the memory 32, where they can be executed by the processor 30. Briefly, the string generator 40, hashing engine 42, and encryption engine 44 are used to encrypt the data to be transmitted to the server 20 by the client 18. The signature generator 46 generates a signature for transmitting from the client 18 to the server 20 for authenticating the data transmission and the identity of the client 18.

The client 18 illustrated in FIG. 1 also comprises a database 50. In the illustrated embodiment, the database 50 comprises key data 52, character string data 53, signature data 56, and transmission data 58. The key data 52 comprises information associated with keys used to identify the client 18 and to encrypt and decrypt the data transmitted from the client to the server 20. For example, in the illustrated embodiment, the key data 52 comprises an identification key 60 used to identify the client 18. For example, the identification key 60 may comprise a serial number or other type of identifier indicating the particular client 18 transmitting the data. The key data 52 also comprises a private key 62 and a hash key 64. Briefly, the hash key 64 is generated using the private key 62. The hash key 64 is then used to encrypt and decrypt the transmitted data.

In the illustrated embodiment, the transmission data 58 comprises unencrypted data 70 and encrypted data 72. The data 70 comprises information provided by a user of the client 18 intended to be transmitted to the server 20 in an unencrypted or decrypted format. The encrypted data 72 comprises an encrypted format of the data 70 which is transmitted to the server 20 via the Internet 12.

In operation, the string generator 40 randomly generates and stores the character string 54 in the database 50. The hashing engine 42 hashes the character string 54 with the private key 62 to generate the hash key 64, which is also stored in the database 50. The encryption engine 44 then encrypts the data 70 using the hash key 64 as an encryption password. As briefly described above, the encrypted data 72 may also be stored in the database 50. The processor 30 then transmits the character string 54, the encrypted data 72, and the identification key 60 to the server 20 via the Internet 12. Decryption of the encrypted data 72 by the server 20 will be described in greater detail below. Additionally, although identified as an "encryption" engine 44, it should be understood that the encryption engine 44 may be used to either encrypt or decrypt data; however, the present invention may also be configured using separate encrypting and decrypting components.

The signature generator 46 generates and stores the signature 56 in the database 50 by hashing the hash key 64 with the data 70. The processor 30 also transmits the signature 56 to the server 20 via the Internet 12. Authentication or verification of the transmitted data and the identity of the client 18 by the server 20 using the signature 56 will be described in greater detail below.

In the illustrated embodiment, the server 20 also comprises a processor 80 coupled to a memory 82. The present invention also encompasses computer software that may be stored in the memory 82 and executed by the processor 80. In this embodiment, the server 20 comprises a string generator 84, a hashing engine 86, a decryption engine 88, and a signature engine 90, which are computer software programs. In FIG. 1, the string generator 84, hashing engine 86, decryption engine 88, and signature engine 90 are illustrated as being stored in the memory 82, where they can be executed by the processor 80. Briefly, the hashing engine 86, decryption engine 88, and signature engine 90 are used to decrypt and verify or authenticate the data received from the client 18. The string generator 84 is used for generating a random character string in connection with transmitting data from the server 20 to the client 18 in a similar manner as described above. Additionally, although identified as a "decryption" engine 88, it should be understood that the decryption engine 88 may be used to either encrypt or decrypt data.

The server 20 also comprises a database 100 accessible by the processor 80. In the illustrated embodiment, the database 100 comprises relational data 102 and transmission data 104. The relational data 102 comprises information associated with relating encryption and decryption keys for each of the clients 18 to the transmitted identification keys 60. For example, in the illustrated embodiment, the relational data 102 comprises identification keys 108 and private keys 110 arranged in a look-up table or other format such that for each identification key 108, a matching or corresponding private key 110 may be identified. Accordingly, the identification keys 60 and 108 and the private keys 62 and 110 are correlated so that data encryption and decryption may be performed at each end of the data transmission path.

The transmission data 104 comprises information associated with the data received from the client 18. For example, in the illustrated embodiment, the transmission data 104 comprises encrypted data 112 and decrypted data 114. The encrypted data 112 comprises the information received from the client 18 via the Internet 12 in an encrypted format. Accordingly, the decrypted data 114 comprises the information received from the client 18 via the Internet 12 after decryption using the decryption engine 88. However, the decrypted data 114 may also comprise information in an unencrypted format intended to be transmitted from the server 20 to the client 18.

In operation, the server 20 receives the character string 54 from the client 18 and stores the character string 54 in the database 100 as a character string 116. Using the identification key 60 received from the client 18, the processor 80 accesses the relational data 102 of the database 100 to determine the private key 110 corresponding to the identification key 60. For example, as described above, the relational data 102 may comprise a look-up table relating each identification key 108 to a private key 110. Using the identification key 60, a corresponding identification key 108 may be identified, thereby also identifying the corresponding private key 110. The hashing engine 86 generates and stores a hash key 118 in the database 100 by hashing the private key 110 with the character string 116. The decryption engine 88 then decrypts the encrypted data 112 using the hash key 118. The decrypted data 114 is then stored in the database 100.

To authenticate the transmitted data and the identity of the client 18, the signature engine 90 is used to verify or authenticate the signature 56 received from the client 18. In operation, the signature engine 90 hashes the hash key 118 with the decrypted data 114 to generate a signature 120 which is stored in the database 100. The signature 120 may then be compared with the signature 56 to verify and authenticate the transmitted data and the identity of the client 18. If the signature 120 does not match the signature 56, the processor 80 may be configured to generate an alert or alarm to a user of the system 10 and/or discard the transmission data 104.

The present invention may also be used to transmit data from the server 20 to the client 18 via the Internet 12. For example, the string generator 84 may be used to randomly generate and store a character string 116 in the database 100. The hashing engine 86 may hash the private key 110 corresponding to the client 18 with the character string 116 to generate the hash key 118. Using the hash key 118, the engine 88 may be used to encrypt data to be transmitted to the client 18. The encrypted data and the character string 116 are then transmitted from the server 20 to the client 18 via the Internet 12. The client 18 may then decrypt the data using the character string 116 and the private key 62 similar to as described above in connection with the server 20. For example, the hashing engine 42 may be used to hash the character string 116 generated by the generator 84 with the private key 62 to generate the hash key 64 for decrypting the received encrypted data 112. The signature engine 90 may also be used to generate a signature 120 corresponding to the transmitted data by hashing the hash key 118 with the data similar to as described above in connection with the client 18. The signature 120 may then be transmitted to the client 18 via the Internet 12. The client 18 may then compare the signature 120 to a signature generated by the signature generator 46 using the hash key 64 and the decrypted data. The processors 30 and 80 may also be configured to incorporate a sequence number or identifier into the data 70 and 114 such that duplicate or out-of-sequence data transmissions received by either the client 18 or server 20 are discarded or rejected.

FIG. 2 is a flowchart illustrating a method for secure data transmission in accordance with an embodiment of the present invention. The method begins at step 200, where the identification key 60 is stored in the database 50. At step 204, the private key 62 corresponding to the client 18 is also stored in the database 50. The client 18 receives data to be transmitted to the server 20 via the Internet 12 at step 206. At step 208, the string generator 40 generates a random character string 54 and stores the character string 54 in the database 50. At step 210, the hashing engine 42 generates the hash key 64 by hashing the private key 62 with the character string 54. At step 212, the encryption engine 44 encrypts the data 70 to be transmitted to the server 20 using the hash key 64 as an encryption password.

At step 214, the signature generator 46 generates the signature 56 by hashing the hash key 64 with the data 70. The character string 54, the encrypted data 72, the identification key 60 corresponding to the client 18, and the signature 56 are then transmitted to the server 20 via the Internet 12 at step 216.

FIG. 3 is a flowchart illustrating a method for secure data transmission in accordance with another embodiment of the present invention. The method begins at step 300 where identification keys 108 corresponding to each client 18 are stored in the database 100. At step 302, private keys 110 relating to each of the identification keys 108 are also stored in the database 100. At step 304, the server 20 receives the character string 54, the encrypted data 72, the identification key 60 corresponding to the transmitting client 18, and the signature 56 from the client 18.

At step 306, the processor 80 accesses the relational data 102 of the database 100. At step 308, the received identification key 60 of the client 18 is used to determine the private key 110 corresponding to the client 18. At step 310, the hashing engine 86 generates the hash key 118 by hashing the private key 110 with the character string 54 received from the client 18. At step 312, the decryption engine 88 decrypts the encrypted data 72 received from the client 18 using the hash key 118 and stores the decrypted data 114 in the database 100. At step 314, the signature engine 90 generates the signature 120 by hashing the hash key 118 with the decrypted data 114.

At step 316, the generated signature 120 is compared to the received signature 56 to verify and authenticate the received data. At decisional step 318, a determination is made whether the signature 120 matches the signature 56. If the signature 120 matches the signature 56, the method ends. If the signature 120 does not match the signature 56, the method proceeds from step 318 to step 320, where the decrypted data 114 may be discarded. Additionally, an alert indicating that the signature 120 does not match the signature 56 may be generated at step 322.

Thus, the present invention provides secure data transmission without requiring certificates or other third party-provided information. Accordingly, the present invention substantially reduces or eliminates the likelihood of third-party interception and subversion of the transmitted data. Additionally, because the present invention does not encompass the use of time-based certificates, reliance on system clocks and the blind acceptance of potentially invalid certificates is substantially eliminated. Further, unlike secure shell or other tunneling protocols, the encryption key changes with each transmitted data packet, thereby further reducing the likelihood of third party interception and subversion.

It should be understood that in the described methods, certain steps may be omitted or accomplished in a sequence different from that depicted in FIGS. 2 and 3. For example, referring to FIG. 2, step 208 of generating the character string 54 may be accomplished at any time prior to the step 210 of generating the hash key 64. Also, it should be understood that the methods depicted in FIGS. 2 and 3 may be altered to encompass any of the other features or aspects of the invention as described elsewhere in the specification.

What is claimed is:

1. A method for secure data transmission, comprising:
generating a character string at a sender for each data packet associated with the secure data transmission;
generating a hash key using the character string and a private key, wherein the hash key is different for each data packet associated with the secure data transmission;
encrypting a data packet associated with the secure data transmission using the hash key; and
transmitting an identification key associated with the sender, the character string, and the encrypted data packet from the sender to a recipient.

2. The method of claim 1, wherein generating the hash key comprises hashing the character string with the private key.

3. The method of claim 1, further comprising:
generating a signature using the hash key and the data; and
transmitting the signature from the sender to the recipient.

4. The method of claim 1, wherein generating a character string comprises randomly generating the character string.

5. The method of claim 1, further comprising:
determining the private key at the recipient using the identification key; and
decrypting the encrypted data at the recipient using the private key and the character string.

6. The method of claim 5, wherein determining the private key comprises accessing a relational database associating the identification key to the private key.

7. The method of claim 1, further comprising:
determining the private key at the recipient using the identification key;
determining the hash key at the recipient using the private key and the character string; and
decrypting the encrypted data using the hash key.

8. The method of claim 7, wherein determining the hash key comprises hashing the private key with the character string.

9. The method of claim 1, further comprising:
generating a first signature by the sender using the hash key and the data; and
transmitting the first signature to the recipient, the recipient adapted to determine the hash key for decrypting the data and compare the first signature to a second signature generated by the recipient using the hash key and the decrypted data.

10. The method of claim 1, further comprising:
generating a signature using the hash key and the data;
transmitting the signature to the recipient;
determining the private key at the recipient using the identification key;
determining the hash key at the recipient using the private key and the character string;
decrypting the encrypted data at the recipient using the hash key; and
verifying the signature at the recipient using the hash key and the decrypted data.

11. A method for secure data transmission, comprising:
receiving a plurality of character strings from a sender,
receiving an identification key from the sender,
receiving a plurality of encrypted data packets from the sender, each of the plurality of character strings correspond to one of the plurality of encrypted data packets;
determining a private key associated with the sender using the identification key; and
decrypting the plurality of encrypted data packets using the private key and the respective character strings.

12. The method of claim 11, further comprising determining a hash key using the character string and the private key, and wherein decrypting the encrypted data comprises decrypting the encrypted data using the hash key.

13. The method of claim 11, wherein determining the private key comprises accessing a relational database associating the identification key to the private key.

14. The method of claim 11, wherein receiving the character string comprises receiving a randomly generated character string.

15. The method of claim 11, further comprising hashing the character string with the private key to generate a hash key, and wherein decrypting the encrypted data comprises decrypting the encrypted data using the hash key.

16. The method of claim 11, further comprising:
receiving a signature from the sender; and
verifying the signature using the decrypted data, the private key, and the character string.

17. The method of claim 11, further comprising:
receiving a signature from the sender;
determining a hash key using the private key and the character string; and
verifying the signature using the decrypted data and the hash key.

18. The method of claim 11, further comprising:
receiving a first signature from the sender,
determining a hash key using the private key and the character string;
generating a second signature using the hash key and the decrypted data; and
comparing the first signature to the second signature.

19. A system for secure data transmission, comprising:
a processor;
a memory coupled to the processor;
a string generator stored in the memory and executable by the processor, the string generator adapted to generate a character string;
a hashing engine stored in the memory and executable by the processor, the hashing engine adapted to generate a hash key using the character string and a private key wherein the hash key is different for each data packet associated with the secure data transmission; and
an encryption engine stored in the memory and executable by the processor, the encryption engine adapted to encrypt the data using the hash key; and
wherein the processor is adapted to transmit the encrypted data, an identification key related to the private key, and the character string to a recipient.

20. The system of claim 19, further comprising a signature engine stored in the memory and executable by the processor, the signature engine adapted to generate a signature using the hash key and the data, the processor further adapted to transmit the signature to the recipient.

21. The system of claim 20, wherein the recipient is adapted to decrypt the encrypted data and verify the signature using the decrypted data.

22. The system of claim 19, wherein the hashing engine is adapted to hash the character string with the private key to generate the hash key.

23. The system of claim 19, wherein the string generator is adapted to randomly generate the character string.

24. The system of claim 19, wherein the recipient is adapted to decrypt the encrypted data using the identification key and the character string.

25. The system of claim 19, wherein the recipient is adapted to determine the hash key using the identification key and the character string and decrypt the encrypted data using the hash key.

26. The system of claim 19, wherein the recipient is adapted to access a relational database associating the identification key with the private key and decrypt the encrypted data using the private key and the character string.

27. A system for secure data transmission, comprising:
a processor adapted to receive a plurality of encrypted data packets, an identification key, and a plurality of character string strings from a sender, each of the plurality of character strings correspond to one of the plurality of encrypted data packets;
a memory coupled to the processor;
a relational database stored in the memory and accessible by the processor, the relational database relating the identification key to a private key; and
a decryption engine stored in the memory and executable by the processor, the decryption engine adapted to decrypt the encrypted data packets using the respective character strings and the private key.

28. The system of claim 27, further comprising a hashing engine stored in the memory and executable by the processor, the hashing engine adapted to generate a hash key using the private key and the character string, the decryption engine adapted to decrypt the encrypted data using the hash key.

29. The system of claim 27, further comprising a signature engine stored in the memory and executable by the processor, the signature engine adapted to verify a signature received from the sender using the private key and the character string.

30. The system of claim 27, further comprising:
a hashing engine stored in the memory and executable by the processor, the hashing engine adapted to generate a hash key using the private key and the character string; and
a signature engine stored in the memory and executable by the processor, the signature engine adapted to verify a signature received from the sender using the hash key and the decrypted data.

31. The system of claim 27, further comprising a hashing engine stored in the memory and executable by the processor, the hashing engine adapted to hash the character string with the private key to generate a hash key, the decryption engine adapted to decrypt the encrypted data using the hash key.

32. The system of claim 27, further comprising a string generator stored in the memory and executable by the processor, the string generator adapted to generate a character string, and wherein the decryption engine is further adapted to encrypt-data for transmitting to the sender using the character string and the private key.

33. The system of claim 32, further comprising:
a string generator stored in the memory and executable by the processor, the string generator adapted to generate a character string; and
a hashing engine stored in the memory and executable by the processor, the hashing engine adapted to hash the character string with the private key to generate a hash key, and wherein the decryption engine is further adapted to encrypt data for transmitting to the sender using the hash key.

34. The system of claim 32, further comprising a signature engine stored in the memory and executable by the processor, the signature engine adapted to generate a first signature using the decrypted data and compare the first signature to a second signature received from the sender.

\* \* \* \* \*

UNITED STATES PATENT AND TRADEMARK OFFICE
CERTIFICATE OF CORRECTION

PATENT NO. : 8,117,450 B2  Page 1 of 1
APPLICATION NO. : 09/975815
DATED : February 14, 2012
INVENTOR(S) : Neal A. Krawetz It is certified that error appears in the above-identified patent and that said Letters Patent is hereby corrected as shown below:

In column 6, line 59, in Claim 11, delete "sender," and insert -- sender; --, therefor.

In column 6, line 60, in Claim 11, delete "sender," and insert -- sender; --, therefor.

In column 7, line 26, in Claim 18, delete "sender," and insert -- sender; --, therefor.

In column 7, line 40, in Claim 19, delete "private key" and insert -- private key, --, therefor.

In column 8, line 12, in Claim 27, delete "string strings" and insert -- strings --, therefor.

Signed and Sealed this
Eighth Day of January, 2013

David J. Kappos
*Director of the United States Patent and Trademark Office*